US009928832B2

(12) United States Patent
Franco et al.

(10) Patent No.: US 9,928,832 B2
(45) Date of Patent: Mar. 27, 2018

(54) METHOD AND APPARATUS FOR CLASSIFYING LEXICAL STRESS

(71) Applicant: SRI International, Menlo Park, CA (US)

(72) Inventors: Horacio E. Franco, Menlo Park, CA (US); Luciana Ferrer, Buenos Aires (AR); Harry Bratt, Mountain View, CA (US); Colleen Richey, Cupertino, CA (US); Kristin Precoda, Mountain View, CA (US); Victor Abrash, Montara, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 14/320,152

(22) Filed: Jun. 30, 2014

(65) Prior Publication Data

US 2015/0170644 A1 Jun. 18, 2015

Related U.S. Application Data

(60) Provisional application No. 61/916,668, filed on Dec. 16, 2013.

(51) Int. Cl.
*G06F 17/27* (2006.01)
*G10L 15/18* (2013.01)
*G10L 25/48* (2013.01)
*G10L 25/24* (2013.01)

(52) U.S. Cl.
CPC .......... *G10L 15/1807* (2013.01); *G10L 25/48* (2013.01); *G10L 25/24* (2013.01)

(58) Field of Classification Search
None
See application file for complete search history.

(56) References Cited

U.S. PATENT DOCUMENTS

| 6,260,016 | B1 * | 7/2001 | Holm | G10L 13/10 704/200 |
|---|---|---|---|---|
| 2003/0033149 | A1 * | 2/2003 | Milligan | G10L 21/06 704/275 |
| 2004/0176960 | A1 * | 9/2004 | Shpiro | G09B 5/06 704/277 |
| 2006/0122834 | A1 * | 6/2006 | Bennett | G10L 15/1822 704/256 |
| 2007/0067174 | A1 * | 3/2007 | Verma | G10L 15/26 704/276 |

(Continued)

OTHER PUBLICATIONS

Freij et al., Lexical Stress Recognition Using Hidden Markov Models, 1988, IEEE, p. 135-138.*

(Continued)

*Primary Examiner* — Kevin Ky
(74) *Attorney, Agent, or Firm* — Hickman Palermo Becker Bingham LLP (57) ABSTRACT

A method for classifying lexical stress in an utterance includes generating a feature vector representing stress characteristics of a syllable occurring in the utterance, wherein the feature vector includes a plurality of features based on prosodic information and spectral information, computing a plurality of scores, wherein each of the plurality of scores is related to a probability of a given class of lexical stress, and classifying the lexical stress of the syllable based on the plurality of scores.

26 Claims, 4 Drawing Sheets

(56) References Cited

U.S. PATENT DOCUMENTS

| | | | | |
|---|---|---|---|---|
| 2008/0147404 | A1* | 6/2008 | Liu | G10L 17/26 704/256.2 |
| 2010/0161327 | A1* | 6/2010 | Chandra | G10L 13/06 704/235 |
| 2015/0120289 | A1* | 4/2015 | Lev-Tov | G10L 15/01 704/231 |

OTHER PUBLICATIONS

J. Tepperman and S. Narayanan, "Automatic syllable stress detection using prosodic features for pronunciation evaluation of language learners," in *Pmc. ICASSP*, Philadelphia, Mar. 2005.

J.Y. Chen and L. Wang, "Automatic lexical stress detection for Chinese learners' of English," in *Chinese Spoken Language Processing (ISCSLP), 2010 7th International Symposium on*, 2010.

O. D. Deshmukh and A. Verma, "Nucleus-level clustering for word-independent syllable stress classification," *Speech Communication*, vol. 51, No. 12, 2009.

L.-Y. Chen and J.-S. Jang, "Stress detection of English words for a CAPT system using word-length dependent GMM-based Bayesian classifiers," *Interdisciplinary Information Sciences*, vol. 18, No. 2, pp. 65-70, 2012.

A. Verma, K.l Lal, Y. Y. Lo, and J. Basak, "Word independent model for syllable stress evaluation," in *Pmc. ICASSP*, Toulouse, May 2006.

C. Li, J. Liu, and S. Xia, "English sentence stress detection system based on HMM framework," *Applied Mathematics and Computation*, vol. 185, No. 2, 2007.

M. Lai, Y. Chen, M. Chu, Y. Zhao, and F. Hu, "A hierarchical approach to automatic stress detection in English sentences," in *Proc. ICASSP*, Toulouse, May 2006.

S. Ananthakrishnan and S. Narayanan, "An automatic prosody recognizer using a coupled multi-stream acoustic model and a syntactic-prosodic language model," in *Proc. ICASSP*, Philadelphia, Mar. 2005.

E. Oxman and E. Golshtein, "Detection of lexical stress using an iterative feature normalization method," in *Afeka-AVIOS Speech Processing Conference 2012*, 2012.

Horacio Franco, Victor Abrash, Kristin Precoda, Harry Bratt, Ramana Rao, John Butzberger, Romain Rossier, and Federico Cesari, "The SRI EduSpeak™ system: Recognition and pronunciation scoring for language learning," *Proceedings of InSTILL 2000*, 2000.

H. Franco, H. Bratt, R. Rossier, V. R. Gadde, E. Shriberg, V. Abrash, and K. Precoda, "EduSpeak: A speech recognition and pronunciation scoring toolkit for computer-aided language learning applications," *Language Testing*, vol. 27, No. 3, pp. 401-418, Jul. 2010.

D. Talkin, *Robust Algorithm for Pitch Tracking*, Elsevier Science, 1995.

A. Sluijter and V. J. Van Heuven, "Spectral balance as an acoustic correlate of linguistic stress," *The Journal of the Acoustical Society of America*, vol. 100, 1996.

Chi-Yueh Lin and Hsiao-Chuan Wang, "Language identification using pitch contour information," in *Proc. ICASSP*, Philadelphia, Mar. 2005, vol. 1, pp. 601-604.

Douglas A. Reynolds, Thomas F. Quatieri, and Robert B. Dunn, "Speaker verification using adapted Gaussian mixture models," *Digital Signal Processing*, vol. 10, pp. 19-41, 2000.

Luciana Ferrer, Mitchell McLaren, Nicolas Scheffer, Yun Lei, Martin Graciarena, and Vikramjit Mitra, "A noise-robust system for nist 2012 speaker recognition evaluation," in *Proc. Interspeech*, Lyon, France, Aug. 2013.

H. Doddala, O. D. Deshmukh, and A. Verma, "Role of nucleus based context in word-independent syllable stress classification," in *Proc. ICASSP*, Prague, May 2011.

K. Sjolander and J. Beskow, "Wavesurfer—an open source speech tool," in Proc. ICSLP, Beijing, Oct. 2000, China Military Friendship Publication.

* cited by examiner

METHOD AND APPARATUS FOR CLASSIFYING LEXICAL STRESS

CROSS REFERENCE TO RELATED APPLICATIONS

This application claims the benefit of U.S. Provisional Patent Application Ser. No. 61/916,668, filed Dec. 16, 2013, which is herein incorporated by reference in its entirety.

FIELD OF THE INVENTION

The present invention relates generally to language learning, and relates more particularly to the detection and classification of lexical stress in utterances.

BACKGROUND OF THE DISCLOSURE

Lexical stress is an important component of pronunciation in many languages. For instance, in the English language, native speakers rely not only on the pronunciation of sounds, but also on the stress patterns, to understand spoken words; use of an incorrect stress pattern can greatly reduce a speaker's intelligibility. This presents a challenge for individuals learning new languages, particularly when those individuals' native languages use more consistent lexical stress patterns or incorporate timing and rhythm in different ways.

Conventional language learning applications that attempt to classify lexical stress usually do so at the word level (i.e., simply indicating which syllable of a word was the most stressed). That is, such systems assume that exactly one syllable in every word has primary stress. However, an individual learning a new language may in fact stress more than one syllable in a given word; thus, this conventional approach is not always appropriate or effective.

Moreover, many conventional language learning systems require that a word be pronounced correctly phonetically before making a decision about stress level. Since phonetic and stress pronunciations are often tied together, however, such systems may miss numerous opportunities to correct stress pronunciation mistakes.

SUMMARY OF THE INVENTION

A method for classifying lexical stress in an utterance includes generating a feature vector representing stress characteristics of a syllable occurring in the utterance, wherein the feature vector includes a plurality of features based on prosodic information and spectral information, computing a plurality of scores, wherein each of the plurality of scores is related to a probability of a given class of lexical stress, and classifying the lexical stress of the syllable based on the plurality of scores.

Another method for classifying lexical stress in an utterance includes obtaining a plurality of scores for each syllable of the utterance, wherein each of the plurality of scores is related to a likelihood that the lexical stress of a corresponding syllable corresponds to a specific class of lexical stress, comparing a score for a canonical stress level of the corresponding syllable with a threshold, labeling the corresponding syllable as having the canonical stress level, when the score for the canonical stress level is lower than the threshold, and labeling the corresponding syllable as having a stress level associated with one of the plurality of scores, when the score for the canonical stress level is higher than the threshold.

Another method for classifying lexical stress in an utterance includes obtaining a plurality of scores for each syllable of the utterance, wherein each of the plurality of scores is related to a likelihood that the lexical stress of a corresponding syllable corresponds to a specific class of lexical stress, comparing a score for a canonical stress level of the corresponding syllable with a threshold, labeling the corresponding syllable as having the canonical stress level, when the score for the canonical stress level is lower than the threshold, and labeling the corresponding syllable as having a stress level associated with one of the plurality of scores, when the score for the canonical stress level is higher than the threshold

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for classifying lexical stress. In particular, embodiments of the invention provide a first language (L1)-independent classification of lexical stress by integrating both spectral and segmental (e.g., prosodic) features extracted over syllable nuclei (vowels). Further embodiments of the invention allow for more than one syllable in each word of an input speech sample to be primary stressed, and for provision of syllable-level feedback with more than two levels of stress, thereby providing more detailed information about the actual stress pronounced by the speaker for each syllable than is possible using conventional systems.

In particular, the methods disclosed herein use both spectral and segmental features to detect the level of stress for each syllable in a word of an input speech sample (or a selected portion of the input speech sample). In one embodiment, the segmental features are computed on the vowels, while the spectral features are computed at the frame level and modeled, also over the vowels, by one probability distribution, such as one Gaussian mixture model (GMM), for each stress class. The GMMs are used to obtain segment-level posterior probabilities that are then appended to the segment-level features to obtain a final set of GMMs. The segment-level GMMs are then used to obtain the posterior probabilities for each stress class, and these posterior probabilities are used to make the final classification. In other embodiments, posterior probabilities (or other types of scores) are computed directly, without computing GMMs.

Figure 1:
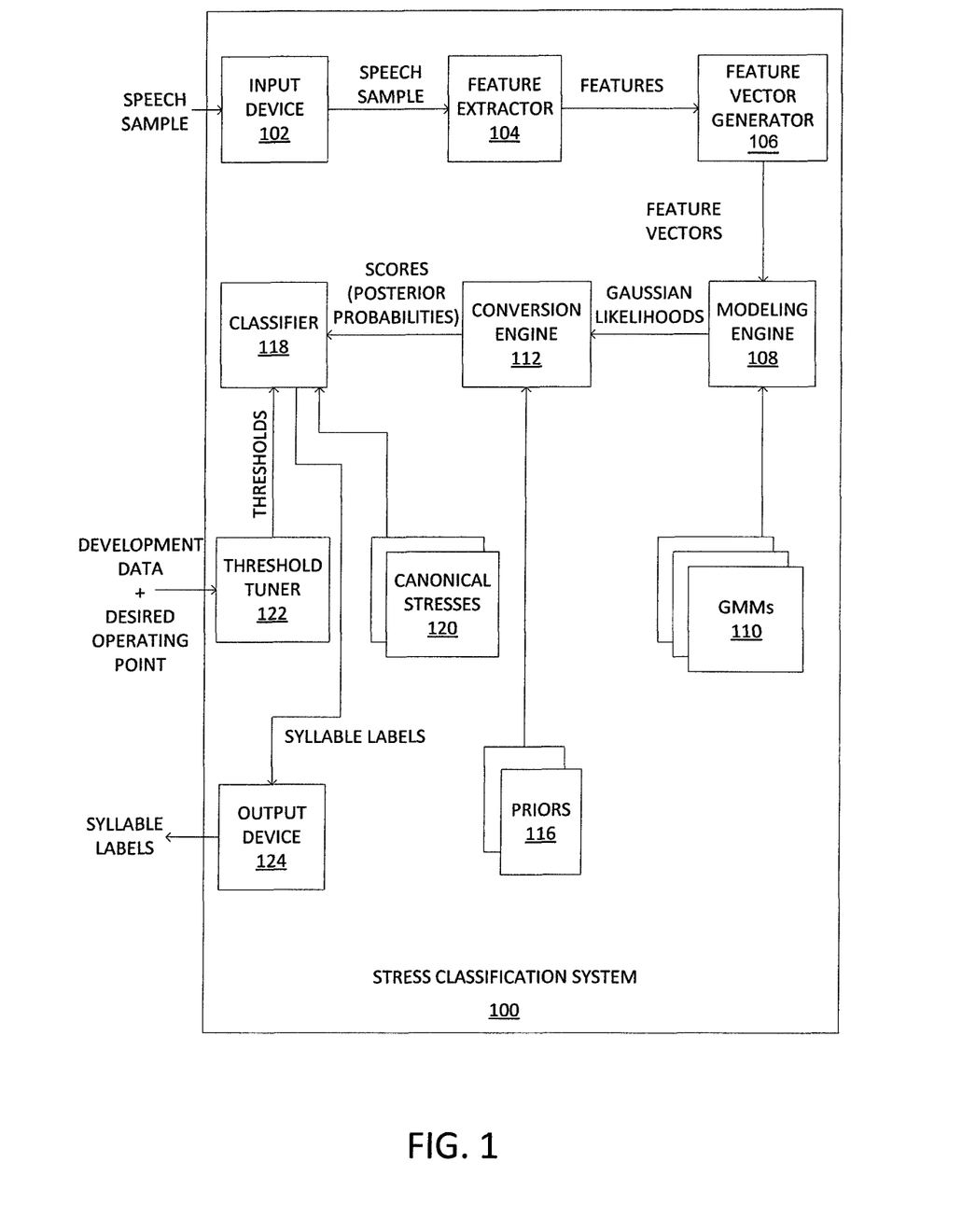
FIG. 1 is a schematic diagram illustrating one embodiment of a system for classifying lexical stress, according to the present invention.

FIG. 1 is a schematic diagram illustrating one embodiment of a system 100 for classifying lexical stress, according to the present invention. The system 100 may operate as a standalone computing system, or the system 100 may be coupled to a separate system, such as a language learning system. The system 100 may be implemented, for example, as a personal computer, a tablet computer, a cellular telephone, a smart phone, a gaming console, a handheld gaming device, a set top box, an Internet ready television, or the like. The system 100 illustrated in FIG. 1 is generalized in order to illustrate the basic components of the present invention.

As illustrated, one embodiment of the system 100 generally comprises a plurality of components, including: an input device 102, a feature extractor 104, a feature vector generator 106, a modeling engine 108, a conversion engine 112, a classifier 118, and an output device 124. As further illustrated, any of these components may rely on data from one or more local or remote data sources. Furthermore, any of these components may comprise a processor. Moreover, although they are illustrated as discrete components, it will be appreciated that, in some cases, two or more of the components may be integrated to form a single component that performs multiple functions. Alternatively, the components may be physically distributed over two or more discrete locations that cooperate with each other to perform the functions of the system 100.

The input device 102 comprises any type of equipment capable of receiving a speech sample, such as a microphone, a transducer, a network interface controller, or the like. The input device 102 is configured to receive an input speech sample (e.g., directly from a speaker or indirectly, e.g., via a network connection from another device or system). In one embodiment, the input device 102 may include an analog-to-digital converter (ADC) or similar device that converts the input speech sample for subsequent processing.

An output of the input device 102 is coupled to an input of the feature extractor 104. The feature extractor 104 receives the input speech sample from the input device 102 and extracts features over the nucleus of each syllable in the input speech sample (or over the nucleus of each syllable in a selected portion of the input speech sample). In one embodiment, the feature extractor 104 extracts segmental features. In one embodiment, the segmental features are derived from the duration of the vowel, pitch, energy, and spectral tilt signals, and mel frequency cepstral coefficients (MFCCs).

In a further embodiment, the feature extractor 104 also normalizes the extracted features in order to render the features as independent as possible of characteristics that might complicate stress classification (such as channel, speech rate, speaker's baseline pitch, etc.). In one embodiment, such normalization is performed at the word level (rather than, e.g., the utterance level) in order to simulate an application that prompts users with single words.

An output of the feature extractor 104 is coupled to an input of the feature vector generator 106. The feature vector generator 106 receives the extracted (and potentially normalized) features from the feature extractor 104 and uses the features to generate a single feature vector, per vowel. In one embodiment, the feature vector is of size nine. In one embodiment, the feature vector generator 106 generates this feature vector by concatenating the various segmental features for a vowel into the corresponding feature vector.

An output of the feature vector generator is coupled to an input of the modeling engine 108. Another input of the modeling engine 108 is coupled to a set of Gaussian mixture models (GMMs) 110. The modeling engine 108 receives the feature vectors produced by the feature vector generator 106 and models the feature vectors with one GMM 110 for each stress class considered. In one embodiment, the modeling engine 108 considers at least three stress classes: primary stressed, secondary stressed, and unstressed. Given a new speech sample, the modeling engine 108 thus computes the likelihood of the GMM for each of the stress classes considered for each vowel in the speech sample (or for each vowel in a selected portion of the speech sample).

An output of the modeling engine 108 is coupled to an input of the conversion engine 112. Additional inputs of the conversion engine 112 may be coupled to a set of priors 116 (e.g., equal priors). The conversion engine 112 receives the Gaussian likelihoods computed by the modeling engine 108 and converts the likelihoods to posterior probabilities. In one embodiment, where the Gaussian likelihoods are believed to be well-estimated, the conversion is performed using Bayes rule (i.e., a set of equations for transforming Gaussian likelihoods to posterior probabilities) and the set of priors 116. In another embodiment, where the Gaussian likelihoods are suspected to not be well-estimated, the conversion is performed using a learned transformation.

An output of the conversion engine 112 is coupled to an input of the classifier 118. Additional inputs of the classifier 118 may be coupled to a set of canonical stresses 120 and to a threshold tuner 122. The classifier 118 receives the posterior probabilities computed by the conversion engine 112 and labels each syllable in the speech sample (or each syllable in a selected portion of the speech sample) with one of the stress classes considered, based on the associated posterior probabilities. As discussed in greater detail below, the classifier 118 considers the canonical (correct) stress 120 for each of the syllables in making this determination. In one embodiment, the canonical stresses are searched for in a stress dictionary or are provided by a user. A detection threshold is used to determine the desired operating point, which is obtained using the threshold tuner 122. Tuning of the threshold allows one to control a level of false alarms (i.e., instances in which the speaker is corrected even though he pronounced the stress correctly).

An output of the classifier 118 is coupled to an input of an output device 124. The output device 124 comprises any type of equipment capable of outputting a signal indicative of the labels assigned to the syllables by the classifier 118, such as a display, a speaker, a haptic feedback device, a network interface controller, or the like. The output device 124 is configured to output this signal for review (e.g., directly to the speaker or indirectly, e.g., via a network connection to another device or system).

Figure 2:
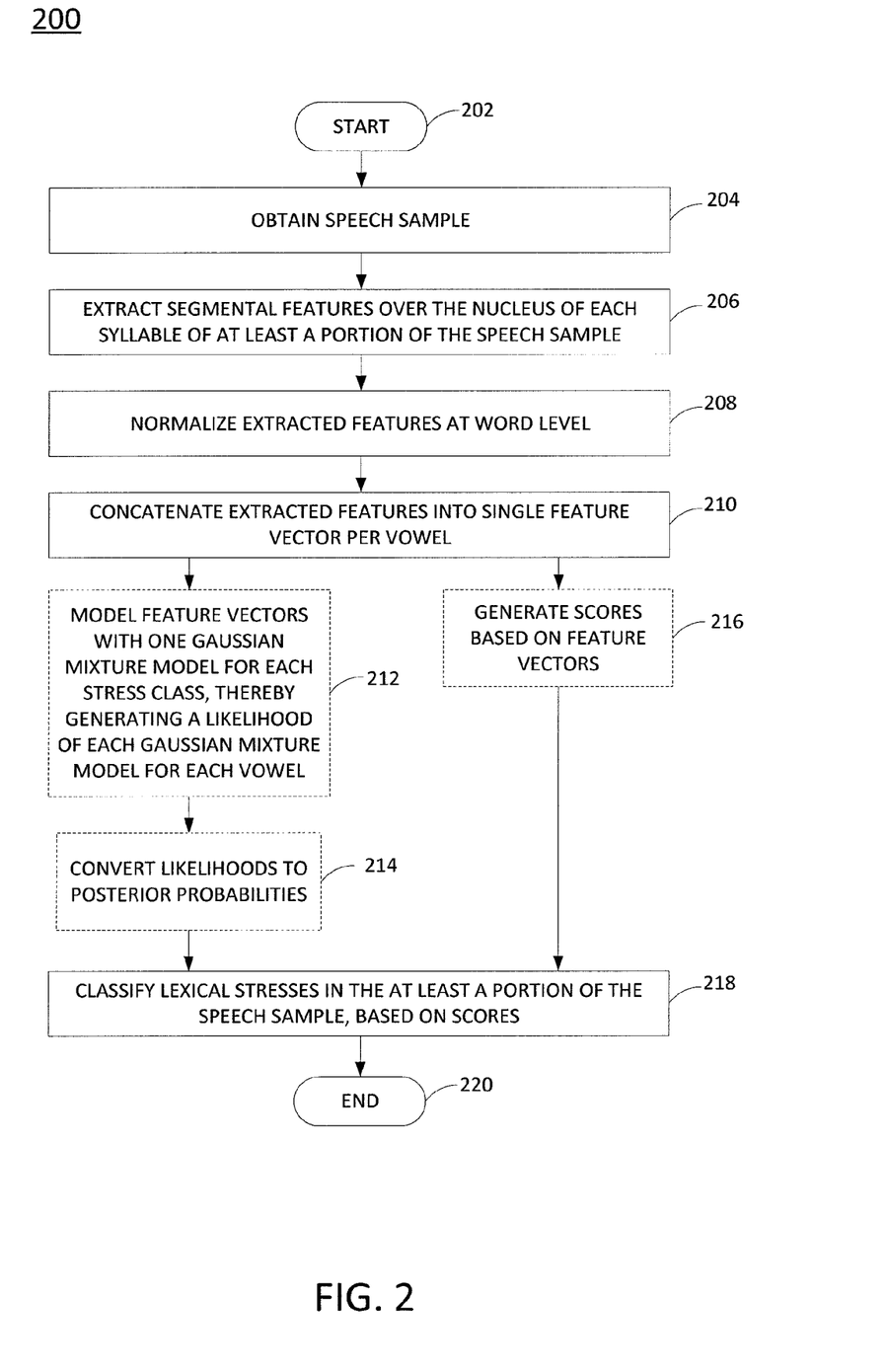
FIG. 2 is a flow diagram illustrating one embodiment of a method for classifying lexical stress, according to the present invention.

FIG. 2 is a flow diagram illustrating one embodiment of a method 200 for classifying lexical stress, according to the present invention. The method 200 may be implemented, for example, by the system 100 illustrated in FIG. 1. As such, reference is made in the discussion of the method 200 to various elements of the system 100. However, it will be appreciated that the method 200 is not limited to implementation with the system 100, and may in fact by implemented by systems having configurations that vary from that illustrated in FIG. 1.

In one embodiment, the method 200 performs classification of one word at a time (i.e., such that classification cannot be influenced by context from the input speech sample). This allows the method 200 to be successfully implemented in language learning systems that prompt users with single words for stress pronunciation feedback. The method 200 is also word-independent in that is has no previous knowledge of the words of interest.

The method 200 begins in step 202. In step 204, the input device 102 obtains a speech sample, and, optionally, converts the input speech sample to a form convenient for subsequent processing (e.g., an analog-to-digital conversion, for instance). In one embodiment, the speech sample comprises a waveform corresponding to a single word. The input device may additionally obtain a phonetic transcription of the speech sample. For instance, if the speech sample is the word "believe," the phonetic transcription would be "/b/ /ax/ /l/ /iy/ /v/."

In step 206, the feature extractor 104 extracts segmental features of the input speech signal (or a selected portion of the input speech signal), over the nucleus (vowel) of each syllable of the input speech sample. In the example above, these vowels include "/ax/" and "/iy/." As discussed above, these segmental features may include features derived from, for example: duration, pitch, energy, spectral tilt, and MFCCs. In one embodiment, the vowels within the input speech signal are located using an automatic speech recognizer and pronunciation-scoring toolkit for language learning applications. The automatic speech recognizer may be a system that uses a standard GMM hidden Markov model (HMM). In this case, speech recognition is run in a forced alignment mode in which the output is constrained to the words in the transcription. In one embodiment, the forced alignments are created using the MFCCs and the phonetic transcription. A thirty-nine-dimensional acoustic speech feature, comprising energy and twelve MFCCs (plus their deltas and double deltas) may be used. The cepstrum may be normalized using cepstral mean subtraction (CMS) with the normalization coefficients computed over the entire speech signal.

In step 208, the feature extractor 104 optionally normalizes the extracted features at the word level. As discussed above, normalization renders the extracted features as independent as possible of characteristics that might complicate stress classification (such as channel, speech rate, speaker's baseline pitch, etc.). Depending on the feature being normalized, normalization may be accomplished using different approaches. As discussed in further detail below, normalization may be performed for some frame-level features before they are converted to segment-level features (e.g., through polynomial approximation). The alignments resulting from a forced alignment may also be used to compute the normalized duration features and to constrain the MFCC, pitch, energy, and spectral tilt values. As discussed in further detail below, this will result in the generation of two coefficients for each of these features.

For instance, the duration of the vowel in a given syllable may first be normalized by dividing the duration by the mean vowel duration for all syllables of the same type. The syllable type may be determined by concatenating two sub-types: (1) the next consonant type; and (2) the pause type. The next consonant type may be defined as one of the following types: unvoiced following consonant (i.e., the consonant after the vowel is unvoiced), voiced following consonant (i.e., the consonant after the vowel is voiced), or no following consonant (i.e., no consonant follows the vowel; either another vowel follows the vowel, or the vowel is the last sound in the word). The pause type may be defined as non pre-pausal word (i.e., the vowel is not followed by a pause that is longer than 0.1 seconds), pre-pausal word, last syllable (i.e., the vowel is followed by a pause that is longer than 0.1 seconds, and the vowel is the last sound in the word), or pre-pausal word, within-word syllable (i.e., the vowel is followed by a pause that is longer than 0.1 seconds, and the vowel is not the last sound in the word). The duration normalized by syllable type may be further normalized by speech rate by dividing by the mean of the syllable type-normalized duration for all of the vowels within the same word. The logarithm of the final normalized value may be further computed.

Pitch, energy, and spectral tilt signals at the frame level (e.g., every ten milliseconds) may be extracted over the full waveform of the input speech signal. Pitch is approximated by the fundamental frequency (F0), and energy is approximated by the mean root mean square (RMS) value (Eg). In one embodiment, the spectral tilt (ST) signal for each frame is computed as the slope of the Fast Fourier transform (FFT), extracted over a window (e.g., of twenty milliseconds) that is shifted periodically (e.g., every ten milliseconds). In one embodiment, these features are processed by first defining the log of the fundamental frequency, the log of the energy, and the spectral tilt values corresponding to unvoiced frames as undefined; undefined values will be ignored during a subsequent computation of a polynomial approximation. Next, for each word, the mean of the log of the fundamental frequency, the log of the energy, and the spectral tilt signals over the frames corresponding to the vowels is computed; only defined values are considered when computing the mean. Then, for each word, this computed mean is subtracted from the signals, only over the defined values. Finally, for each vowel in each word, a polynomial approximation is computed from the pitch, energy, and spectral tilt values, resulting in two coefficients for each signal. In one embodiment, the polynomial approximation is of order one; however, higher orders are also possible and may produce better results when enough domain-matched data is available. The resulting six coefficients are subsequently considered as the normalized pitch, energy, and spectral tilt features for the vowel.

MFCCs are computed periodically (e.g., every ten milliseconds). In one embodiment, MFCCs over the vowels are modeled using one Gaussian mixture model (GMM) for each stress class. These GMMs are obtained by adaptation to a single GMM trained using samples from all stress classes in the same way as described below for segmental features. Given a test utterance, the likelihood of each of these GMMs is computed for each frame over each vowel. The geometric mean of the likelihoods over all frames in a vowel is computed for each stress class, resulting in one likelihood for each stress class. These likelihoods are transformed into posterior probabilities using Bayes rule (e.g., assuming equal priors for all stress classes), or alternatively using a learned transformation. Thus, spectral information is converted into segment-level posterior probabilities. Finally, the logs of the posterior probabilities for at least a subset of the stress classes are considered as normalized, segment-level MFCC features.

Referring back to FIG. 2, in step 210, the feature vector generator 106 concatenates the extracted features (which have optionally been normalized) into a single segment-level feature vector per vowel. In one embodiment, the single feature vector has a size of nine: two polynomial coefficients for pitch, two polynomial coefficients for energy, two polynomial coefficients for spectral tilt, log normalized duration, and the log MFCC posterior probabilities for two stress classes (e.g., unstressed and primary stressed).

Once the feature vectors have been generated, scores may be computed based on the feature vectors, where the scores are related (e.g., functionally related or statistically related) to a probability of a given class of lexical stress. There is a plurality of ways in which these scores may be computed; FIG. 2 illustrates two ways. A first way involves computing Gaussian likelihoods and then converting the Gaussian likelihoods to posterior probabilities, as discussed in greater detail with respect to steps 212-214. A second, alternative way involves computing the scores directly from the feature vectors, without computing Gaussian likelihoods, as discussed in greater detail with respect to step 216.

In optional step 212 (illustrated in phantom), the modeling engine 108 models the feature vectors with one GMM for each stress class considered. The GMMs are trained on data from native speakers of the language being learned. This results in a likelihood of each segment-level GMM being generated for each vowel. In one embodiment, three stress classes are considered: primary stressed, secondary stressed, and unstressed (and, thus, three likelihoods are generated for each vowel based on the modeling). The models may be trained using data from native speakers of the language being learned and optionally adapted to data from native speakers of a second language speaking the language being learned.

In one embodiment, the modeling is performed in two steps. First, a single model for all of the stress classes is trained. Then, a class-dependent model is obtained by adapting the single model to the data for each of the stress classes. This approach trains robust models, even for the stress classes for which relatively little data may be available (e.g., the secondary stressed class, which tends to have less data available than the primary stressed and unstressed classes). In one embodiment, the adaptation of the single model to the data for each of the stress classes is performed using a maximum a posteriori (MAP) approach that is commonly used for speaker recognition. This approach introduces a regularization parameter (i.e., the relevance factor) that controls how much the global means, weights, and covariances, should be adapted to the data from each class.

The MAP approach may also be used to adapt class-dependent GMMs to data from non-native speakers of the language being learned. If the amount of non-native training data available is small, only the means and weights may be adapted.

In optional step 214 (illustrated in phantom), the conversion engine 112 generates a plurality of scores based on the feature vectors, where each of the plurality of scores is related (e.g., functionally related or statistically related) to a probability of a given class of lexical stress. In one embodiment, the scores comprise posterior probabilities; however, in alternative embodiments, the scores may comprise support vector machine scores, likelihoods, or other types of scores. In one embodiment (i.e., where step 212 has been performed to obtain Gaussian likelihoods), the conversion engine 112 converts the likelihoods computed in step 212 to posterior probabilities using Bayes rule, or alternatively using a learned transformation. In one embodiment, where Bayes rule is used, this conversion is performed using equal priors. In another embodiment, the priors may be computed on the native training data or on the non-native trainings data, or alternatively may be set arbitrarily to what they are expected to be during testing.

As an alternative to steps 212-214, the method 200 may instead proceed from step 210 to step 216 (i.e., bypassing steps 212-214). In optional step 216 (illustrated in phantom), generates a plurality of scores based on the feature vectors, where each of the plurality of scores is related (e.g., functionally related or statistically related) to a probability of a given class of lexical stress. The scores may comprise posterior probabilities, support vector machine scores, likelihoods, or other types of scores. In step 216, the conversion engine 112 computes the scores directly (e.g., rather than converting Gaussian likelihoods as in step 214). For instance, the conversion engine 112 may compute the scores directly using alternative modeling techniques such as neural networks, decision trees, radial basis functions, or the like.

In step 218, the classifier 118 classifies the lexical stresses in the speech sample (or the selected portion of the speech sample). Classification is based on the scores computed in step 214 or 216, as well as on the canonical (correct) stresses for each of the syllables and on a tunable threshold. One embodiment of a method for classifying a vowel according to the stress classes considered is discussed in greater detail with respect to FIG. 3.

Once the lexical stresses have been classified, the method 200 ends in step 220. Subsequently, the classifications may be output (e.g., by the output device 124) to the speaker and/or to a language learning system or other computing device.

Figure 3:
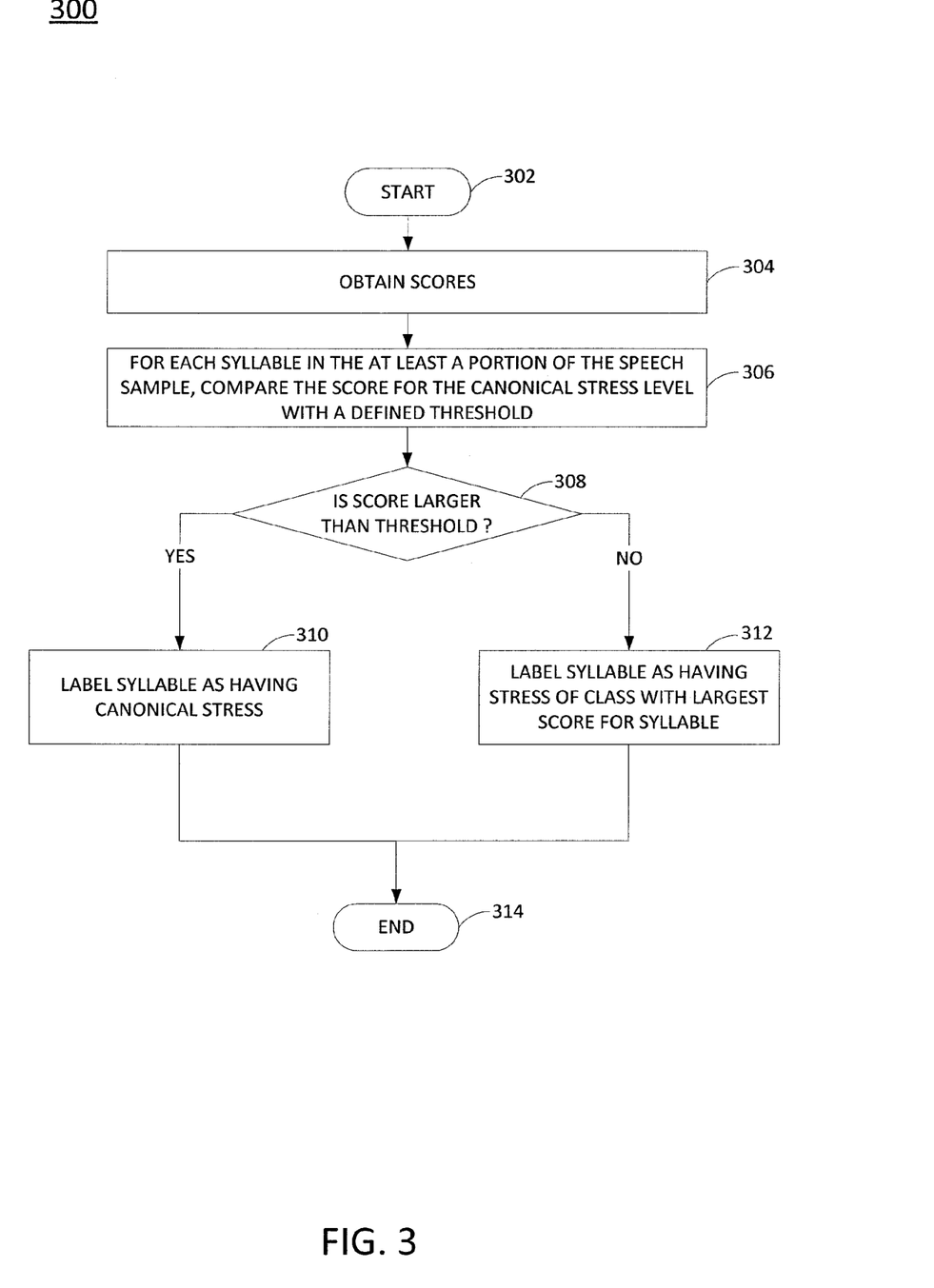
FIG. 3 is a flow diagram illustrating one embodiment of a method 300 for classifying the lexical stress of individual syllables in a speech sample, according to the present invention.

FIG. 3 is a flow diagram illustrating one embodiment of a method 300 for classifying the lexical stress of individual syllables in a speech sample, according to the present invention. The method 300 may be executed, for example, in conjunction with step 218 of the method 200. Thus, like the method 200, the method 300 may be implemented by the system 100 illustrated in FIG. 1. As such, reference is made in the discussion of the method 300 to various elements of the system 100. However, it will be appreciated that the method 300 is not limited to implementation with the system 100, and may in fact by implemented by systems having configurations that vary from that illustrated in FIG. 1.

The method 300 begins in step 302. In step 304, the classifier 118 obtains scores (e.g., posterior probabilities, support vector machine scores, likelihoods, etc.) associated with the likelihoods of a plurality of stress class models (e.g., GMMs) for each vowel of an input speech sample (or a selected portion of an input speech sample). In one embodiment, the scores are monotonically related to the probabilities of the plurality of stress classes. The scores may be generated in the manner discussed above in connection with steps 202-216 of the method 200. Alternatively, the scores may be generated using different modeling techniques, such as decision trees, neural networks, radial basis functions, or the like. Thus, the method 300 is not necessarily dependent on the use of the method 200 to generate the scores.

In step 306, the classifier 118 compares, for each syllable in the input speech sample (or the selected portion of an input speech sample), the score for the syllable's canonical (correct) stress level with a defined threshold. As discussed above, the threshold is tunable. The threshold may also be dependent on the canonical stress label (e.g., there may be different thresholds for primary stressed, secondary stressed, and unstressed syllables).

In step 308, the classifier 118 determines whether the score for the syllable's canonical stress level is larger than the defined threshold.

If the classifier 118 concludes in step 308 that the syllable's canonical stress level is larger than the defined threshold, then the method 300 proceeds to step 310. In step 310, the classifier 118 labels the syllable as having the canonical stress.

Alternatively, if the classifier 118 concludes in step 308 that the syllable's canonical stress level is not larger than the defined threshold, then the method 300 proceeds to step 312. In step 312, the classifier 118 labels the syllable as having the stress of the class (e.g., primary stressed, secondary stressed, or unstressed) with the largest score for the syllable (i.e., based on the scores obtained in step 304). Thus, the method 300 decides against the canonical stress class only when the canonical stress's score is lower than the threshold (which depends on the desired maximum level of false alarms) and when the canonical stress class's score is not the maximum across all stress classes.

The method 300 ends in step 314.

In an alternative embodiment, syllables may simply be labeled according to the stress class with the highest score for the syllables. However, the method 300 is proposed as a means of reducing the number of false alarms generated by the more simplistic approach. As discussed above, the number of false alarms generated by the method 300 can be controlled by varying the threshold (e.g., via the threshold tuner 122).

In yet another alternative embodiment, the classifier may label the syllable as having the canonical stress if the syllable's canonical stress level is lower than the defined threshold. In this case, if the syllable's canonical stress level is higher than the defined threshold, then the classifier labels the syllable as having the stress of the class with the lowest score for the syllable. Thus, in this case, the method 300 would decide against the canonical stress only when the canonical stress's score is higher than the threshold and when the canonical stress class's score is not the minimum across all stress classes.

By allowing for more than one syllable in each word of the input speech sample to be primary stressed, and by giving syllable-level feedback with more than two levels of stress, the system 100 is able to provide detailed information about the actual stress pronounced by the speaker for each syllable.

Figure 4:
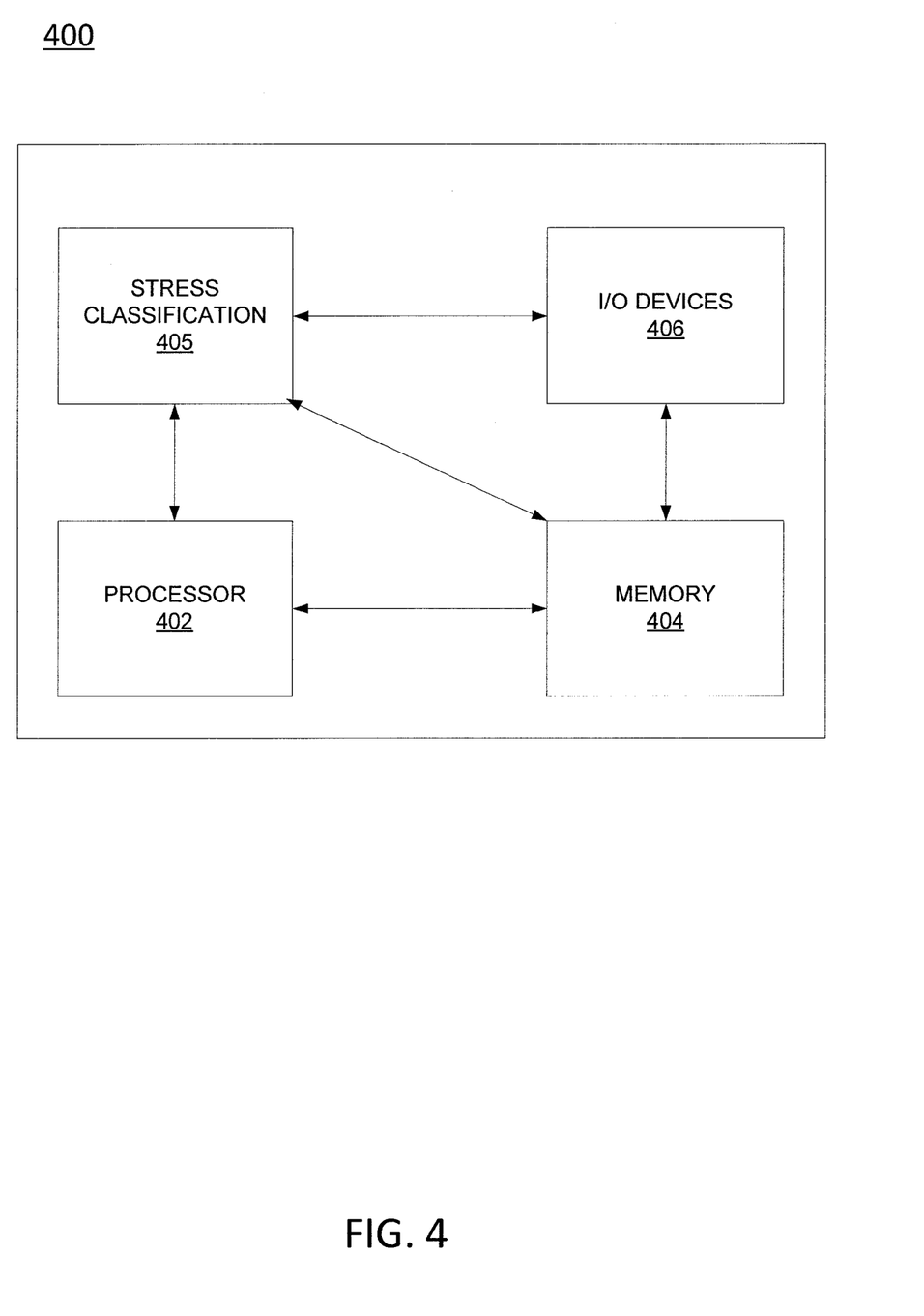
FIG. 4 is a high level block diagram of the present invention implemented using a general purpose computing device 400.

FIG. 4 is a high level block diagram of the present invention implemented using a general purpose computing device 400. It should be understood that embodiments of the invention can be implemented as a physical device or subsystem that is coupled to a processor through a communication channel. Therefore, in one embodiment, a general purpose computing device 400 comprises a processor 402, a memory 404, a stress classification module 405, and various input/output (I/O) devices 406 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., stress classification module 405) can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the stress classification module 405 for classifying lexical stress in an input speech sample described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for classifying lexical stress in a speech sample to enable a computing device to provide stress pronunciation feedback usable by a speaker whose speech is represented in the speech sample, the method comprising:
   determining a plurality of syllables in the speech sample;
   locating vowels associated with the syllables of the speech sample;
   executing a feature extractor on the computing system;
   with the feature extractor, over a duration of a vowel located in a syllable of the speech sample, determining a plurality of features of the vowel that are usable by the computing system to determine a level of stress associated with the syllable;
   executing a modeling engine on the computing system;
   with the modeling engine, using the features of the vowel and at least one model created using other speech samples, computing a plurality of scores for the vowel relating to at least two of a likelihood that the syllable is primary stressed and a likelihood that the syllable is secondary stressed and a likelihood that the syllable is unstressed;
   executing a classifier on the computing system;
   using as inputs to the classifier a threshold, the plurality of scores for the vowel, and a canonical stress level for the syllable, determining a stress label for the syllable;
   tuning the threshold to improve stress pronunciation feedback output by the computing device in response to the speech sample.

2. The method of claim 1, wherein determining the plurality of features of the vowel comprises computing a segmental feature on the vowel.

3. The method of claim 2, wherein determining the plurality of features of the vowel comprises computing a plurality of spectral features over a time frame associated with the vowel.

4. The method of claim 3, comprising including both the segmental features and the spectral features in a feature vector.

5. The method of claim 4, comprising using the feature vector to compute the plurality of scores.

6. The method of claim 1, wherein the plurality of scores comprises at least three scores relating to a likelihood that the syllable is primary stressed and a likelihood that the syllable is secondary stressed and a likelihood that the syllable is unstressed.

7. The method of claim 1, wherein the threshold comprises a plurality of thresholds corresponding to the at least two of the likelihood that the syllable is primary stressed and the likelihood that the syllable is secondary stressed and the likelihood that the syllable is unstressed.

8. The method of claim 1, comprising outputting the stress pronunciation feedback to an output device.

9. The method of claim 1, comprising outputting the stress pronunciation feedback for use by a language learning system.

10. A system for enabling a computing device to interpret an un-interpreted portion of natural language captured by an audio input device coupled to the computing device so that the computing device can execute an action in response to the un-interpreted portion of the natural language, the system comprising:
- one or more processors;
- a communication interface coupled to the one or more processors;
- one or more non-transitory computer-readable storage media coupled to the one or more processors and storing sequences of instructions, which when executed by the one or more processors, cause the one or more processors to perform operations comprising:
- determining a plurality of syllables in the speech sample;
- locating vowels associated with the syllables of the speech sample;
- executing a feature extractor on the computing system;
- with the feature extractor, over a duration of a vowel located in a syllable of the speech sample, determining a plurality of features of the vowel that are usable by the computing system to determine a level of stress associated with the syllable;
- executing a modeling engine on the computing system;
- with the modeling engine, using the features of the vowel and at least one model created using other speech samples, computing a plurality of scores for the vowel relating to at least two of a likelihood that the syllable is primary stressed and a likelihood that the syllable is secondary stressed and a likelihood that the syllable is unstressed;
- executing a classifier on the computing system;
- using as inputs to the classifier a threshold, the plurality of scores for the vowel, and a canonical stress level for the syllable, determining a stress label for the syllable;
- tuning the threshold to improve stress pronunciation feedback output by the computing device in response to the speech sample.

11. The system of claim 10, wherein determining the plurality of features of the vowel comprises computing a segmental feature on the vowel.

12. The system of claim 11, wherein determining the plurality of features of the vowel comprises computing a plurality of spectral features over a time frame associated with the vowel.

13. The system of claim 12, wherein the instructions, when executed by the one or more processors, cause the one or more processors to perform operations comprising including both the segmental features and the spectral features in a feature vector.

14. The system of claim 13, wherein the instructions, when executed by the one or more processors, cause the one or more processors to perform operations comprising using the feature vector to compute the plurality of scores.

15. The system of claim 10, wherein the plurality of scores comprises at least three scores relating to a likelihood that the syllable is primary stressed and a likelihood that the syllable is secondary stressed and a likelihood that the syllable is unstressed.

16. The system of claim 10, wherein the threshold comprises a plurality of thresholds corresponding to the at least two of the likelihood that the syllable is primary stressed and the likelihood that the syllable is secondary stressed and the likelihood that the syllable is unstressed.

17. The system of claim 10, wherein the instructions, when executed by the one or more processors, cause the one or more processors to perform operations comprising outputting the stress pronunciation feedback to an output device.

18. The system of claim 10, wherein the instructions, when executed by the one or more processors, cause the one or more processors to perform operations comprising outputting the stress pronunciation feedback for use by a language learning system.

19. A computer program product for enabling a computing device to interpret an un-interpreted portion of natural language captured by an audio input device coupled to the computing device so that the computing device can execute an action in response to the un-interpreted portion of the natural language, the computer program product comprising one or more non-transitory computer readable storage media storing instructions which, when executed by one or more processors, cause the one or more processors to perform operations comprising:
- determining a plurality of syllables in the speech sample;
- locating vowels associated with the syllables of the speech sample;
- executing a feature extractor on the computing system;
- with the feature extractor, over a duration of a vowel located in a syllable of the speech sample, determining a plurality of features of the vowel that are usable to determine a level of stress associated with the syllable;
- executing a modeling engine on the computing system;
- with the modeling engine, using the features of the vowel and at least one model created using other speech samples, computing a plurality of scores for the vowel relating to at least two of a likelihood that the syllable is primary stressed and a likelihood that the syllable is secondary stressed and a likelihood that the syllable is unstressed;
- executing a classifier on the computing system;
- using as inputs to the classifier a threshold, the plurality of scores for the vowel, and a canonical stress level for the syllable, determining a stress label for the syllable;
- tuning the threshold to improve stress pronunciation feedback output by the computing device in response to the speech sample.

20. The computer program product of claim 19, wherein determining the plurality of features of the vowel comprises computing a segmental feature on the vowel.

21. The computer program product of claim 20, wherein determining the plurality of features of the vowel comprises computing a plurality of spectral features over a time frame associated with the vowel.

22. The computer program product of claim 21, wherein the instructions, when executed by the one or more processors, cause the one or more processors to perform operations comprising including both the segmental features and the spectral features in a feature vector.

23. The computer program product of claim 22, wherein the instructions, when executed by the one or more processors, cause the one or more processors to perform operations comprising using the feature vector to compute the plurality of scores.

24. The computer program product of claim 19, wherein the plurality of scores comprises at least three scores relating to a likelihood that the syllable is primary stressed and a likelihood that the syllable is secondary stressed and a likelihood that the syllable is unstressed.

25. The computer program product of claim 19, wherein the threshold comprises a plurality of thresholds corresponding to the at least two of the likelihood that the syllable is primary stressed and the likelihood that the syllable is secondary stressed and the likelihood that the syllable is unstressed.

26. The computer program product of claim 19, wherein the instructions, when executed by the one or more processors, cause the one or more processors to perform operations comprising outputting the stress pronunciation feedback to an output device or for use by a language learning system.

* * * * *